3,061,405
PREPARATION OF THIOPHOSPHORYL BROMIDE
George A. Olah and Stephen J. Kuhn, Sarnia, Ontario, Canada, assignors to The Dow Chemical Company, Midland, Mich., a corporation of Delaware
No Drawing. Filed Mar. 23, 1959, Ser. No. 800,915
Claims priority, application Canada Apr. 30, 1958
7 Claims. (Cl. 23—14)

The invention relates to an improved method for the preparation of thiophosphoryl bromide and more specifically relates to an improved method for the preparation of thiophosphoryl bromide from phosphorus tribromide and elemental sulufur.

Heretofore $PSBr_3$ has been prepared by methods requiring a high reaction temperature or making use of catalysts which result in the production of mixed halides.

It is accordingly an object of the present invention to provide a method by which thiophosphoryl bromide is formed smoothly at a relatively low reaction temperature.

It is another object of the invention to provide a method for the preparation of thiophosphoryl bromide in which the product is readily separated from the reaction mixture.

It is a still further object of the invention to provide a method for the production of substantially pure thiophosphoryl bromide.

Other objects and advantages of the invention will be apparent to one skilled in the art upon becoming familiar with the following description and claims.

The invention is predicated upon the discovery that upon reacting phosphorus tribromide with particulated elemental sulfur at a relatively low temperature and in the presence of a Friedel-Crafts type catalytic inorganic bromide thiophosphoryl bromide is formed in good yield.

In carrying out the invention, a portion of phosphorus tribromide is reacted with about the stoichiometric amount of elemental sulfur in a suitable reactor or vessel which preferably has been dried and which may be equipped with a water-cooled condenser and with a stirrer. The sulfur is preferably finely divided as are flowers of sulfur to facilitate shorter reaction times. While reaction may be initiated upon heating the reactants to an elevated temperature, under such temperature conditions not only is the reaction rate difficult to control but undesired products are formed.

To obtain a smooth reaction at a desirably low temperature, an amount of a catalytic inorganic bromide, of the Friedel-Crafts type, corresponding to from about 0.01 to 2 percent of the weight of phosphorus tribromide employed is added to the reaction mixture, though larger amounts of catalyst may be used. Suitable catalysts include $AlBr_3$, $FeBr_3$, $TiBr_4$, $BBr_3$ and $SbBr_3$ added as such or in some instances formed in situ. Of these, $AlBr_3$ is to be preferred as promoting to a lesser extent than the other catalysts undesirable side reactions. Although $AlCl_3$ readily catalyzes the formation of $PSBr_3$ the use of $AlCl_3$ also results in the formation of corresponding mixed halogen compounds such as $PSBr_2Cl$. The use of the less active catalytic bromides has shown the surprising result that the addition of sulfur to $PBr_3$ takes place smoothly at low reaction temperatures. While it has also now been found that catalytic inorganic iodides are active enough to promote the desired reaction, the problem of the formation of mixed halogen compounds is again encountered.

If the reactor has been equipped with a stirrer, stirring is commenced while the catalyzed reaction mixture is brought to a temperature in the range of about 90 to 140° C. but preferably in the range of about 100 to 120° C. The reaction is very mild and no refluxing is ordinarily observed. Reaction is generally completed in 30 minutes to 1 hour. The resulting reaction product will then solidify if allowed to cool to room temperature. Purified $PSBr_3$ is obtained from the said reaction product by distillation, preferably at a reduced pressure. The boiling temperature range of $PSBr_3$ under a pressure of about 20 mm. Hg is 115 to 120° C.

In another manner of producing purified $PSBr_3$ the said reaction product is brought to a temperature of about 40° C., which is just slightly above the melting point, and poured into an amount of cold water equal to from about one-quarter to two times the weight of the reaction product, though a larger amount of water may be used. The amount of water should be sufficient to readily dissolve the catalyst as well as permit a phase separation. The water and the reaction product are brought into intimate contact, as by shaking, for about two to five minutes. Warming the mixture to about 40° C. to melt the $PSBr_3$ then facilitates a phase separation, the product $PSBr_3$ being heavier than water. The heavier product phase is then drawn off, as from a separatory funnel, and dried in an evacuated container such as a vacuum desiccator charged with a suitable desiccant, e.g., phosphorus pentoxide.

As an example of carrying out the invention 2 g. of sublimed aluminum bromide were added to 194.4 g. (0.72 mole) of phosphorus tribromide contained in a 500 ml. round bottom glass flask provided with a reflux condenser and mechanical stirrer. Stirring was commenced and 23 g. (0.72 g. atom) of powdered sulfur were added to the flask in small portions. The reaction mixture was then moderately heated to maintain the temperature at 100 to 120° C. for 30 minutes during which time the reaction was completed. When allowed to cool to room temperature the resulting reaction product solidified. The said reaction product was then melted at 40° C. and poured into 500 ml. of cold water contained in a one liter separatory funnel, and the mixture was shaken for two to three minutes and let stand to permit a phase separation. The phase separation was facilitated by warming the aqueous mixture to about 40° C. The heavy product phase was then drawn off and dried in a vacuum desiccator over phosphorus pentoxide. 200 g. of thiophosphoryl bromide (92 percent of theoretical) were obtained having a melting point of 37.5° C.

As an additional example of carrying out the invention 270.7 g. (1 mole) of phosphorus tribromide were reacted with 32 g. (1 g. atom) of powdered sulfur in the presence of 0.5 g. of aluminum bromide under the same conditions and in the same manner, as described in the above example. The reaction went smoothly to completion and 272.5 g. of thiophosphoryl bromide (90 percent of theoretical), purified as in the above example, were obtained.

The embodiments of the invention in which an exclusive property or privilege is claimed are defined as follows:

1. The improved method for the preparation of substantially pure thiophosphoryl bromide comprising reacting substantially stoichiometric amounts of phosphorus tribromide and elemental sulfur at a temperature in the range of 90 to 140° C. and in the presence of a catalytic inorganic bromide selected from the group consisting of aluminum tribromide, iron tribromide, titanium tetrabromide, boron tribromide and antimony tribromide.

2. The method as in claim 1 in which the catalytic inorganic bromide is aluminum bromide.

3. The improved method for the preparation of substantially pure thiophosphoryl bromide comprising reacting at a temperature between 90° C. and 140° C. substantially stoichiometric amounts of phosphorus tribromide and elemental sulfur in the presence of at least 0.01 percent by weight, based on the weight of the phosphorus tribromide, of a catalytic inorganic bromide selected from the group consisting of aluminum tribromide, iron tribromide, titanium tetrabromide, boron tribromide and antimony tribromide.

4. The method of claim 3 in which the catalytic inorganic bromide is aluminum bromide.

5. The improved method for the preparation of substantially pure thiophosphoryl bromide comprising reacting substantially stoichiometric amounts of phosphorus tribromide and elemental sulfur at a temperature in the range of 90 to 140° C. and in the presence of at least 0.01 percent by weight, based on the weight of the phosphorus tribromide, of a catalytic inorganic bromide selected from the group consisting of aluminum tribromide, iron tribromide, titanium tetrabromide, boron tribromide and antimony tribromide, and separating thiophosphoryl bromide from the resulting reaction product.

6. The method as in claim 5 in which thiophosphoryl bromide is distilled from the said reaction product at a reduced pressure of less than 50 mm. of mercury.

7. The method as in claim 5 in which thiophosphoryl bromide is separated from the said reaction product by intimately contacting the said reaction product with an amount of cold water sufficient to readily dissolve the said catalytic inorganic bromide, separating the thiophosphoryl bromide phase from the water phase, and drying the so-separated thiophosphoryl bromide.

References Cited in the file of this patent

UNITED STATES PATENTS

| | | |
|---|---|---|
| 2,542,610 | Young | Feb. 20, 1951 |
| 2,591,782 | Cook | Apr. 8, 1952 |

OTHER REFERENCES

J. W. Mellor: A Comprehensive Treatise on Inorganic and Theoretical Chemistry, vol. VIII, 1928, published by Longmans, Green and Co., New York, N.Y., page 1076.

Ferneluis: "Inorganic Syntheses," 1946, vol. II, pp. 151, 154–154. (Copy in Scientific Library.)